US005800795A

United States Patent [19]

Ryan et al.

[11] Patent Number: 5,800,795
[45] Date of Patent: Sep. 1, 1998

[54] HYDROGEN FLUORIDE RECOVERY PROCESS

[75] Inventors: Thomas Anthony Ryan, Kelsall; John Graham Allen, Warrington; Helen Marie Schoelzel, Leigh; Massimino Ugo Pilotti, Widnes, all of United Kingdom

[73] Assignee: Imperial Chemical Industries PLC, Great Britain

[21] Appl. No.: 948,213

[22] Filed: Oct. 9, 1997

Related U.S. Application Data

[63] Continuation of Ser. No. 522,234, filed as PCT/GB94/00490 Mar. 11, 1994, published as WO94/20412 Sep. 15, 1994, abandoned.

[30] Foreign Application Priority Data

Mar. 12, 1993 [GB] United Kingdom ................. 9305148

[51] Int. Cl.[6] ........................................... G01B 7/19
[52] U.S. Cl. ............................................ 423/484; 423/488
[58] Field of Search .......................... 423/483, 484, 423/488, 472

[56] References Cited

U.S. PATENT DOCUMENTS

| 2,462,739 | 2/1949 | Gresham | 423/484 |
|---|---|---|---|
| 3,157,469 | 11/1964 | Tuggs | 423/483 |
| 3,195,979 | 7/1965 | Burkert et al. | 423/483 |
| 3,314,755 | 4/1967 | Claus | 423/483 |
| 3,574,542 | 4/1971 | Hartig | 423/240 R |
| 3,976,447 | 8/1976 | Merchant et al. | 423/483 |

FOREIGN PATENT DOCUMENTS

| 0 509 885 | 10/1992 | European Pat. Off. |
|---|---|---|
| 2 128 712 | 10/1972 | France . |
| 1141260 | 1/1969 | United Kingdom ........... 423/484 |
| 1332968 | 10/1973 | United Kingdom ........... 423/484 |

OTHER PUBLICATIONS

Chemical Abstract 78: 140845q "Study of Thermal Stability . . . Method" vol. 78, No. 22, Jun. 1973.
Chemical Abstract 81: 144823r: "Physical Chemical Studies of Likium Hydro-Fluoride", vol. 81, No. 22, Dec. 1974.
Chemical Abstract 85: 167447t: "The Binary Systems Lithium-Fluoride-Hydrogen Fluoride . . . Fluoride", vol. 85, No. 22, Nov. 1976.
Database WPI Week 9106 Derwent Publications Ltd., London, GB ANN 91-04128/06 & SU,A,1 549 581 (E. F. Lednev) 15 Mar. 1990.

*Primary Examiner*—Ngoc-Yen Nguyen

[57] ABSTRACT

Process for the recovery of hydrogen fluoride (HF) from a mixture, preferably an azeotropic mixture, of HF with water and/or an organic compound such as 134a, 125 or 133a, which comprises contacting the mixture with lithium fluoride or an alkaline earth metal fluoride to form a metal fluoride-hydrogen fluoride compound (e.g. lithium bifluoride, $LiHF_2$), separating the compound and decomposing it to liberate hydrogen fluoride therefrom. The process is useful for recovering HF from azeotropic or azeotropic-like mixtures.

11 Claims, No Drawings

HYDROGEN FLUORIDE RECOVERY PROCESS

This is a continuation of application Ser. No. 08/522,234 filed on Sep. 1, 1995, now abandoned, which is a national application filing under 35 U.S.C. 371 of International Application No. PCT/GB94/00490, Mar. 11, 1994, now WO94/20,412.

FIELD OF THE INVENTION

This invention relates to a hydrogen fluoride recovery process and particularly to a process for the recovery of (or separation of) hydrogen fluoride from mixtures thereof with water and/or organic compounds, especially from azeotropic or near azeotropic mixtures of hydrogen fluoride with water and/or organic compounds.

BACKGROUND OF THE INVENTION

There is a need in industry to recover substantially anhydrous hydrogen fluoride from mixtures thereof with water in view of the highly corrosive character of such mixtures and the general unsuitability of wet hydrogen fluoride as a reagent in many chemical processes. However, the drying of hydrogen fluoride, ie the recovery of substantially anhydrous hydrogen fluoride from its mixture with water, is extremely difficult in view of the powerful affinity of hydrogen fluoride for water and the formation of an azeotrope or azeotrope-like mixture containing a large amount of hydrogen fluoride, for example about 38% by weight of hydrogen fluoride at room temperature and atmospheric pressure.

There is also a need in industry to separate and recover hydrogen fluoride from mixtures thereof with organic compounds, for instance from the product, by-product and recycle streams from processes for the production of fluorine-containing compounds using hydrogen fluoride or another fluorinating agent. Such separations can be difficult if the boiling point of the organic compound is close to that of hydrogen fluoride and/or if it forms an azeotrope or azeotrope-like mixture with hydrogen fluoride. An example of the problem is the removal and recovery of hydrogen fluoride from 1,1,1,2-tetrafluoroethane, HFA 134a, during purification of the latter; HFA 134a forms an azeotrope with hydrogen fluoride of composition 1:3 molar ratio hydrogen fluoride/HFA 134a at 25° C. and atmospheric pressure (1.0 bar). Other examples of azeotropes which present separation problems are hydrogen fluoride/pentafluoroethane (HFA 125), molar ratio 1:9 at 25° C. and 1 bar and hydrogen fluoride/chloro-1,1,1-trifluoroethane (HCFC 133a), molar ratio 1.7:1 at 25° C. and 1 bar.

SUMMARY OF THE INVENTION

According to the present invention there is provided a process for the recovery of hydrogen fluoride from a mixture thereof with water and/or an organic compound which comprises contacting the mixture with an essentially insoluble metal fluoride selected from lithium fluoride and alkaline earth metal fluorides, separating the resulting metal fluoride-hydrogen fluoride compound from the aqueous or organic phase depleted in hydrogen fluoride and decomposing the metal fluoride-hydrogen fluoride compound to liberate hydrogen fluoride therefrom.

The mixture of hydrogen fluoride and water and/or organic compound will usually be the azeotropic or near-azeotropic mixture.

The metal fluoride should be essentially insoluble in the mixture or the components thereof; where the mixture contains water the metal fluoride should be essentially water-insoluble.

Decomposition of the metal fluoride-hydrogen fluoride compound may be effected in a number of ways, for example by heating the compound to a temperature at which thermal decomposition occurs with liberation of hydrogen fluoride and (re)formation of the metal fluoride starting material for re-use in the process. The metal fluoride-hydrogen fluoride compounds are in general thermally unstable materials which decompose, albeit generally only slowly, at low temperatures (say below 100° C.) with release of hydrogen fluoride. Whilst the rate of decomposition at any particular temperature can be increased by operating under reduced pressure and/or by removing hydrogen fluoride from the vicinity of the compound as it is liberated (for example by passing a carrier gas over the compound or adding the compound to water or another medium in which hydrogen fluoride is soluble), we prefer to heat the compound to increase the rate of decomposition to a rate which is acceptable in practice. The temperature at which the compound is heated will depend upon the particular metal fluoride employed but preferably is greater than 100° C., especially greater than 120° C. However, the optimum temperature for any particular metal fluoride-hydrogen fluoride compound is readily determined by simple routine experimentation.

In view of the preference for heating the compound above 100° C. to effect thermal decomposition there may be no need to dry the compound and/or remove the organic compound(s) before it is heated; water and/or organic compound evaporated from the compound during the initial heating step can be collected and removed separately before hydrogen fluoride is liberated from the compound. If desired, the heating step may comprise two distinct stages, a first, relatively low temperature, predominantly drying stage and a second, higher temperature, predominantly decomposition stage.

An alternative method for effecting decomposition of the metal fluoride-hydrogen fluoride compound, at least in the case where the metal fluoride is lithium fluoride (and the compound is lithium bifluoride, Li[HF$_2$]) comprises contacting the compound with a mixture of hydrogen fluoride and water and/or an organic compound at a temperature greater than the temperature at which the compound is formed in the mixture.

For example where the mixture being separated is aqueous hydrogen fluoride, the metal fluoride-hydrogen fluoride compound can be decomposed by contacting it with a fresh sample of the aqueous mixture being separated, i.e. with aqueous hydrogen fluoride, at a temperature greater than the temperature at which the compound is formed in aqueous hydrogen fluoride. Likewise where the mixture being separated comprises hydrogen fluoride and an organic compound, contact with a fresh sample of the mixture being separated at a higher temperature can be used to effect the decomposition of the compound. The mixture used during decomposition of the metal fluoride-hydrogen fluoride compound need not be the same as the mixture from which the compound is formed but for practical purposes it will usually be the same mixture.

This embodiment of the process is particularly useful for the treatment of liquid hydrogen fluoride/water mixtures and in this case comprises (a) contacting the mixture of hydrogen fluoride and water with the metal fluoride at a first temperature, (b) separating the resulting metal fluoride-hydrogen fluoride compound from the liquid phase depleted in hydrogen fluoride, (c) contacting the separated metal fluoride-hydrogen fluoride compound with a mixture of hydrogen fluoride and water at a second temperature higher than the first temperature to decompose the compound and liberate hydrogen fluoride and (d) separating the resulting metal fluoride from the liquid phase enriched in hydrogen fluoride.

The mixture of hydrogen fluoride and water used in both of steps (a) and (c) of the above embodiment is preferably the azeotropic mixture or a near-azeotropic mixture. In this way the liquid phase separated in step (b) will be deficient in hydrogen fluoride relative to the azeotrope and the liquid phase separated in step (d) will be rich in hydrogen fluoride relative to the azeotrope. Simple distillation of the HF-deficient mixture from step (b) will result in the formation of the azeotrope and removal of free water whilst distillation of the HF-rich mixture from step (d) will result in formation of the azeotrope and removal of free hydrogen fluoride. The overall effect of the process is thus separation of water and hydrogen fluoride, ie recovery of hydrogen fluoride from the azeotrope. The azeotrope formed in the distillation steps can be recycled to the process of the invention.

The temperature at which the mixture is contacted with the metal fluoride to form the compound is such as to favour formation of the metal fluoride-hydrogen fluoride compound rather than decomposition of this compound and generally will be below about 35° C.; in general lowering the temperature increases the tendency to form the compound but at least in the case of aqueous mixtures this needs to be balanced against the lower mass difusional effects and rates of formation of the compound as the temperature is decreased. It will be appreciated that the temperature guidelines given for formation of the metal fluoride-hydrogen fluoride compound are irrespective of the procedure employed for decomposition of the compound.

The mixture which is contacted with the metal fluoride may be in the liquid phase or the vapour phase depending upon the normal phase of the mixture at the temperature and pressure at which the contact is effected. Since in general lower temperatures favour formation of the metal fluoride-hydrogen fluoride compound whilst higher temperatures favour decomposition of the compound, the contact is usually effected at lower temperatures such that aqueous hydrogen fluoride mixtures will be in the liquid phase whilst mixtures of low boiling organic compounds with hydrogen fluoride may be in the vapour phase. The phase of the mixture is not critical, however, since the metal fluoride will remove hydrogen fluoride from liquid or vapour phases.

The temperature at which the metal fluoride-hydrogen fluoride compound is decomposed in step (c) is preferably greater than about 35° C., especially greater than 80° C., up to the boiling point of the liquid phase in which the decomposition is effected. If desired, step (c) may be effected under reflux conditions whereby steps (c) and (d) are combined and the need for a separate distillation step (d) is obviated.

The process according to the invention or any step thereof may be operated at atmospheric pressure or at subatmospheric or superatmospheric pressure.

The metal fluoride is selected from lithium fluoride and the alkaline earth metal fluorides. The metal fluoride is essentially insoluble in the mixture (e.g. in water) at all temperatures at which it is in contact with the mixture (e.g. water), in particular, especially where the mixture contains water, at temperatures of from 0° C. to 100° C. Whilst ideally the metal fluoride should be completely insoluble in the mixture, it is to be understood that slight solubility may be tolerable, for example up to about 5% by weight. The metal fluoride-hydrogen fluoride compound preferably also is completely insoluble in the mixture, although again slight solubility can be tolerated.

The proportion of hydrogen fluoride extracted from the mixture in a single contact with the metal fluoride depends on the particular metal fluoride employed, the amount of the metal fluoride and the time for which the mixture is maintained in contact with the metal fluoride. Generally, increasing the amount of the metal fluoride and increasing the contact time will both increase the proportion of hydrogen fluoride extracted from the mixture. For practical purposes however, it may be necessary to strike a compromise between hydrogen fluoride recovery per contact, the amount of the metal fluoride used and the contact time and the process will usually be operated to achieve a hydrogen fluoride recovery per contact which is less than that theoretically attainable. It will be appreciated that this situation is acceptable since the hydrogen fluoride remaining in the mixture, ie not extracted, can be recycled to the process so that substantially total recovery of hydrogen fluoride is achieved eventually.

In the light of the above considerations and as a guide only the amount of the metal fluoride will usually be about equimolar based on the hydrogen fluoride in the mixture being treated and the contact time will usually be from about 5 minutes to about 2 hours.

The process is useful for the recovery/separation of hydrogen fluoride from mixtures thereof with a wide range of organic compounds but is especially useful where the organic compound forms an azeotrope or azeotrope-like mixture with hydrogen fluoride. Usually the mixture will be a product, by-product or recycle stream from a fluorination process, for example a process employing hydrogen fluoride as a fluorinating agent to produce a product containing one or more fluorine atoms. The organic compound will usually contain one or more fluorine atoms and may in addition contain one or more other halogen atoms, notably chlorine atoms. Examples of organic compounds from which hydrogen fluoride can be recovered/separated by the process according to the invention are 1,1,1,2-tetrafluoroethane (HFA 134a), 1,1,2,2-tetrafluoroethane (HFA 134), pentafluoroethane (HFA 125) and chloro-1,1,1-trifluoroethane (HCFC 133a).

The invention is illustrated but in no way limited by the following examples.

EXAMPLE 1

An azeotropic mixture of hydrogen fluoride and water (38% w/w containing 0.57 mole of hydrogen fluoride) was added, with stirring, to a molar equivalent of lithium fluoride ultra-pure powder (0.57 mole) at 0° C. Samples of the aqueous phase were taken after intervals of time and analysed to determined their hydrogen fluoride concentrations.

| Time (mins) | HF concentration (% w/w) |
| --- | --- |
| 0 | 38 |
| 20 | 35 |
| 45 | 33 |
| 120 | 33 |

These results show that hydrogen fluoride was extracted from the aqueous phase which became water rich and could be distilled to remove free water.

A further quantity of the azeotrope (containing 0.28 mole hydrogen fluoride) was then added to the mixture. After 255 minutes, the concentration of hydrogen fluoride in the aqueous phase was determined as 28.2% by weight.

EXAMPLE 2

Lithium fluoride powder as in Example 1 (15.1 g) was added to the 38% w/w azeotropic mixture (30 g) of hydrogen fluoride and water and the mixture was stirred at room temperature (approx 23° C.) for 48 hours. The mixture was then cooled to 0° C. and maintained at 0° C. for 50 minutes. The concentration of hydrogen fluoride in the aqueous phase was determined as 33.5% w/w.

The mixture was then warmed to 55° C. and maintained at 55° C. for a period of 4 hours.

The hydrogen fluoride concentration in the aqueous phase was determined as 37.5% w/w.

These results indicate that at 0° C. the lithium fluoride extracted hydrogen fluoride from the azeotrope and that warming the mixture to 55° C. resulted in regeneration of most of the hydrogen fluoride which had been extracted at 0° C.

EXAMPLE 3

Lithium fluoride powder as in Example 1 (7.8 g) was added to hydrofluoric acid (15 ml) and the resulting slurry was stirred for 50 minutes. At intervals of time as shown below, the slurry was allowed to settle and a sample of the supernatent liquor was removed for analysis before stirring was recommenced. The results of analysis are shown below.

| Time (mins) | HF concentration |
|---|---|
| 0 | 43.4 |
| 10 | 37.0 |
| 25 | 35.8 |
| 50 | 35.8 |

EXAMPLE 4

The effect of varying temperature on HF extraction by lithium fluoride was investigated. Lithium fluoride powder (4.3 g) was added to 38% w/w azeotropic HF and water mixture (22.5 g), and was stirred at the desired temperature for 180 minutes. The concentration of the aqueous phase was determined after filtration of the mixture.

The experiment was carried out at 0°, 22°, 48° and 80° C. The final HF concentrations, alongside the percentage HF conversion, are given below:

| Temperature (°C.) | Final HF concn (% w/w) | HF conversion* (%) |
|---|---|---|
| 0 | 30.0 | 21.0 |
| 22 | 32.0 | 16.8 |
| 48 | 33.5 | 11.9 |
| 80 | 35.7 | 6.0 |

*A conversion of 0% would imply no HF extraction by the lithium fluoride.

The results demonstrate that the higher the temperature, the lower the amount of HF taken up by the LiF. Extrapolation of a graph of % HF Conversion against temperature reveals that at 112° C. there would be no net HF uptake, ie a conversion of 0%—this is known as the crossover temperature, which can be defined as the temperature below which there is net uptake of HF from lithium fluoride and above which there is net release of HF from lithium bifluoride.

EXAMPLE 5

This example illustrates the effect on lithium fluoride (LiF) and HF conversions by varying the LiF to HF molar ratio. The desired quantity of LiF was added to an azeotropic mixture of HF and water (22.5 g) and stirred at room temperature (ca 22° C.) for at least 12 hours to ensure that equilibrium was achieved in the system. The results are shown in the table below, in which the change in equilibrium HF concentration is also shown.

From the results it can be concluded that at a given temperature the equilibrium HF concentration will eventually reach a limiting value (32.2% w/w at room temperature) once there is enough LiF in the system to allow that value to be achieved.

| LiF:HF ratio | LiF conv (%) | HF conv (%) | Equilibrium HF concn (% w/w) |
|---|---|---|---|
| 0.1 | 92.0 | 9.0 | 34.4 |
| 0.3 | 44.4 | 13.0 | 32.9 |
| 0.7 | 21.0 | 14.4 | 32.3 |
| 1.0 | 15.0 | 14.9 | 32.2 |

EXAMPLE 6

This example illustrates that HF can be recovered from lithium bifluoride, obtained from a previous reaction involving HF and LiF. The concentration of the aqueous HF used was 33.5% w/w. In a previous experiment it was shown that by lowering the starting HF concentration, the temperature above which HF could be recovered decreases.

LiF (10.1 g) was added to 33.5% w/w HF/water mixture (55.78 g) and was stirred at 0° C. for 180 minutes. After filtration the HF concentration in the filtrate was found to be 30.2% w/w (a loss of 10% HF). The residue was washed (3×10 ml) with 33.5% HF. A portion (10.5 g) of the wet lithium fluoride/bifluoride mixture was added to 33.5% w/w HF/water mixture (27.88 g) and was stirred at 80° C. for 180 minutes. After filtration, the filtrate was found to have a HF concentration of 39.7% w/w (a gain of 7% HF).

EXAMPLE 7

This Example illustrates the separation of HF from a mixture of HF and 1,1,1,2-tetrafluoroethane (134a). A 5:4 (mole ratio) mixture of gaseous HF/134a, was passed through 10 g of solid LiF, at room temperature and the exit gases were scrubbed with KOH solution. The mixture was produced by passing 134a at 20 ml/minute through the headspace of a HF vessel maintained at −10° C. and it was passed through the LiF for 25 minutes. Analysis of the scrubber liquor showed that the HF in the mixture had been depleted by 83% to a molar ratio of 1:5 HF/134a which is significantly below the composition of the azeotrope (1:3 HF/134a at 25° C., 1.0 bar); thus the experiment demonstrates that the azeotrope can be split using LiF.

Heating the lithium bifluoride, formed in the above reaction, to 200° C. allowed recovery of all the absorbed HF.

EXAMPLE 8

This example illustrates the separation of HF from a mixture of HF and pentafluoroethane (125).

Using the procedure described in Example 7, a 1:5 (molar ratio) mixture of HF/125 was produced using a 125 flow rate of 18 ml/minute and a HF temperature of −20° C. The 1:5 mixture was passed at a rate of 14.2 ml/minute through 7 g of LiF in a reactor tube at room temperature for 1 hour. Analysis of the scrubber liquor determined a 1:25 HF/125 molar ratio in the exit gases from the LiF reactor, representing a reduction in HF of 85%. The LiF had reduced the HF content of the mixture to below the HF content of the azeotrope (1:9 molar ratio HF/125).

EXAMPLE 9

This Example illustrates the separation of HF from a mixture of HF and chloro-1,1,1-trifluoroethane (133a).

Using the procedure described in Example 7, a 1.8:1 (molar ratio) mixture of HF/133a was produced using a 133a flow rate of 8 ml/minute and a HF temperature of 10° C. The 1.8:1 mixture was passed through 4.8 g of LiF in a reactor tube at room temperature for 40 minutes. Analysis of the scrubber liquor showed a 1:8 HF/133a molar ratio in the exit gases from the LiF reactor, representing a reduction in HF of 93%. The LiF had reduced the HF content of the mixture to below the HF content of the azeotrope (1.7:1 HF/133a).

We claim:

1. A process for the recovery of hydrogen fluoride from a mixture of hydrogen fluoride with water, an organic compound or both water and an organic compound which comprises the steps of:
   A. contacting the mixture with lithium fluoride to form a lithium fluoride-hydrogen fluoride compound and an aqueous or organic phase depleted in hydrogen fluoride;
   B. separating the resulting lithium fluoride-hydrogen fluoride compound from the aqueous or organic phase depleted in hydrogen fluoride;
   C. decomposing the lithium fluoride-hydrogen fluoride compound to liberate hydrogen fluoride therefrom by contacting the compound with a second mixture of hydrogen fluoride with water, an organic compound or both water and an organic compound at a temperature greater than that at which the lithium fluoride-hydrogen fluoride compound is formed in said mixture, optionally step C further comprises the step of removing at least part of the water, the organic compound or both the water and the organic compound from the organic or aqueous phase depleted in hydrogen fluoride separated in step B.

2. A process for the recovery of hydrogen fluoride from a mixture of hydrogen fluoride with water, and organic compound or both water and an organic compound which comprises the steps of:
   A. contacting the mixture with lithium fluoride to form a lithium fluoride-hydrogen fluoride compound and an aqueous or organic phase depleted in hydrogen fluoride; and
   B. decomposing the lithium fluoride-hydrogen fluoride compound to liberate hydrogen fluoride therefrom by contacting the compound with a second mixture of hydrogen fluoride with water, an organic compound or both water and an organic compound at a temperature greater than that at which the lithium fluoride/hydrogen fluoride compound is formed in said mixture, optionally step B further comprises the step of removing at least part of the water, the organic compound or both the water and the organic compound from the organic or aqueous phase depleted in hydrogen fluoride formed in step A.

3. A process as claimed in claim 1 or claim 2 in which the mixture of hydrogen fluoride with water, an organic compound or both water and an organic compound is an azeotropic or azeotrope-like mixture.

4. A process as claimed in claim 1 or claim 2 in which the mixture is a mixture of hydrogen fluoride with water.

5. A process as claimed in claim 1 or claim 2 in which the mixture is a mixture of hydrogen fluoride with water and is contacted in the liquid phase with lithium fluoride.

6. A process as claimed in claim 1 or claim 2 in which the mixture is contacted with lithium fluoride at a temperature of below 35° C.

7. A process claimed in claim 1 or claim 2 in which the phase depleted in hydrogen fluoride as a result of contact with the lithium fluoride is distilled to liberate water, the organic compound or both water and the organic compound.

8. A process as claimed in claim 1 or claim 2 in which an equimolar amount of the lithium fluoride is employed based on the hydrogen fluoride content of the mixture.

9. A process as claimed in claim 1 or claim 2 in which the mixture comprises an organic compound containing one or more fluorine atoms.

10. A process as claimed in claim 9 in which the organic compound is selected from 1,1,1,2-tetrafluoroethane (134a), pentafluoroethane (125), and chloro-1,1,1-trifluoroethane (133a).

11. A process as claimed in claim 9 in which the mixture is contacted in the vapor phase with lithium fluoride.

* * * * *